United States Patent [19]
Gutleber

[11] 3,947,674
[45] Mar. 30, 1976

[54] CODE GENERATOR TO PRODUCE PERMUTATIONS OF CODE MATES

[75] Inventor: Frank S. Gutleber, Wayne, N.J.

[73] Assignee: International Telephone and Telegraph Corporation, Nutley, N.J.

[22] Filed: Sept. 28, 1967

[21] Appl. No.: 671,382

[52] U.S. Cl. ............ 235/181; 179/15 BC; 340/348; 343/17.1 R; 343/100 CL
[51] Int. Cl.² .................... G06G 7/19; H03K 13/02
[58] Field of Search ..... 235/181; 343/5 DP, 17.1 R, 343/100 CL; 178/113; 332/11; 340/204, 345, 348, 349; 179/15

[56] References Cited
UNITED STATES PATENTS

| | | | |
|---|---|---|---|
| 3,173,139 | 3/1965 | Welti | 343/17.1 |
| 3,208,065 | 9/1965 | Gutleber et al. | 343/17.1 |
| 3,249,940 | 5/1966 | Erickson | 343/17.1 |
| 3,461,451 | 8/1969 | Gutleber | 340/348 |
| 3,510,595 | 5/1970 | Gutleber | 179/15 BA |
| 3,634,765 | 1/1972 | Gutleber | 179/15 BC |

*Primary Examiner*—Felix D. Gruber
*Attorney, Agent, or Firm*—John T. O'Halloran; Menotti J. Lombardi, Jr.; Alfred C. Hill

[57] ABSTRACT

A class of pseudo-noise multiplexed codes including coding mates having cooperating autocorrelation function which upon detection provides an impulse autocorrelation function. The code mates include at least one blank digit slot in the repetitious period of at least one of the codes of the code mates. One form requires a digit of either binary condition in the first and last digit slot of the code structure with the blank slot being disposed therebetween. The number of code mates can be increased by repeatedly solving the equations of FIG. 5 for the original code mates and the resultant new code mates. The interleaving process required in the equations is achieved by logic circuitry controlled by a control signal having a period equal to the period of a digit slot of the input code mates.

10 Claims, 20 Drawing Figures

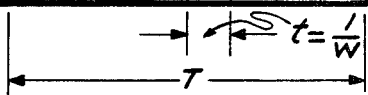
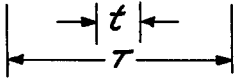

Fig. 7, Fig. 8, Fig. 9, Fig. 10

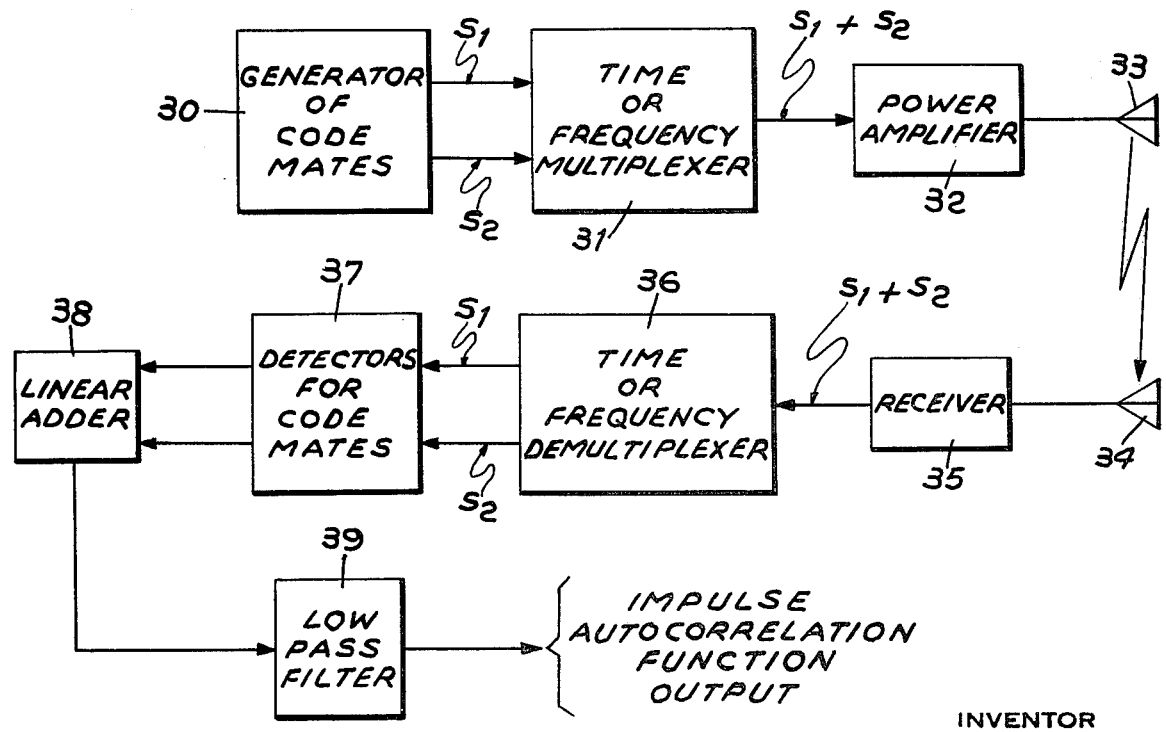

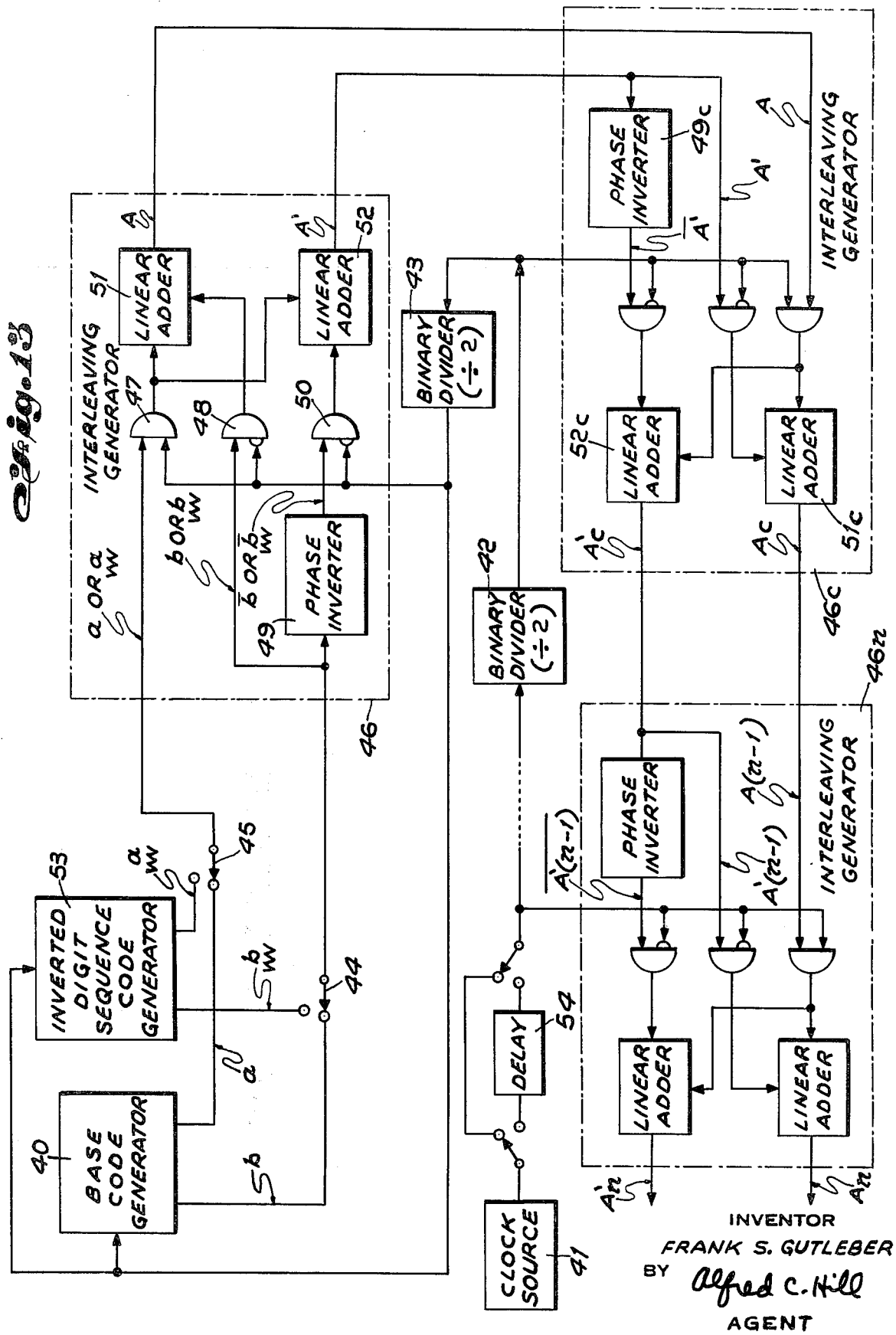

Fig. 14

| Row | Label | t1 | t2 | t3 | t4 |
|---|---|---|---|---|---|
| A | CODE a | $a_1$ | $a_2$ | $a_3$ | $a_4$ |
| B | CODE b | $b_1$ | $b_2$ | $b_3$ | $b_4$ |
| C | OUTPUT INVERTER 49 (DELAY 54 OUT) | $\bar{b}_1$ | $\bar{b}_2$ | $\bar{b}_3$ | $\bar{b}_4$ |
| D | OUTPUT DIVIDER 43 (DELAY 54 OUT) | | | | |
| E | OUTPUT ADDER 51 (DELAY 54 OUT) | $a_1$ $b_1$ | $a_2$ $b_2$ | $a_3$ $b_3$ | $a_4$ $b_4$ |
| F | OUTPUT ADDER 52 (DELAY 54 OUT) | $a_1$ $\bar{b}_1$ | $a_2$ $\bar{b}_2$ | $a_3$ $\bar{b}_3$ | $a_4$ $\bar{b}_4$ |
| G | OUTPUT INVERTER 49c (DELAY 54 OUT) | $\bar{a}_1$ $b_1$ | $\bar{a}_2$ $b_2$ | $\bar{a}_3$ $b_3$ | $\bar{a}_4$ $b_4$ |
| H | OUTPUT DIVIDER 42 (DELAY 54 OUT) | $\bar{a}_1$ | $\bar{a}_2$ | $\bar{a}_3$ | $\bar{a}_4$ |
| I | OUTPUT ADDER 51c (DELAY 54 OUT) | $a_1$ $a_1$ | $a_2$ $a_2$ | $a_3$ $a_3$ | $a_4$ $a_4$ |
| J | OUTPUT ADDER 52c (DELAY 54 OUT) | $a_1$ $\bar{a}_1$ | $a_2$ $\bar{a}_2$ | $a_3$ $\bar{a}_3$ | $a_4$ $\bar{a}_4$ |
| K | OUTPUT DIVIDER 43 (DELAY 54 IN) | | | | |
| L | OUTPUT ADDER 51 (DELAY 54 IN) | $b_1$ | $b_2$ | $b_3$ | $b_4$ |
| M | OUTPUT ADDER 52 (DELAY 54 IN) | $\bar{b}_1$ | $\bar{b}_2$ | $\bar{b}_3$ | $\bar{b}_4$ |
| N | OUTPUT INVERTER 49c (DELAY 54 IN) | $b_1$ | $b_2$ | $b_3$ | $b_4$ |
| O | OUTPUT DIVIDER 43 (DELAY 54 IN) | | | | |
| P | OUTPUT ADDER 51c (DELAY 54 IN) | $b_1$ $\bar{b}_1$ | $b_2$ $\bar{b}_2$ | $b_3$ $\bar{b}_3$ | $b_4$ $\bar{b}_4$ |
| Q | OUTPUT ADDER 52c (DELAY 54 IN) | $b_1$ $b_1$ | $b_2$ $b_2$ | $b_3$ $b_3$ | $b_4$ $b_4$ |

INVENTOR
FRANK S. GUTLEBER
BY Alfred C. Hill
AGENT

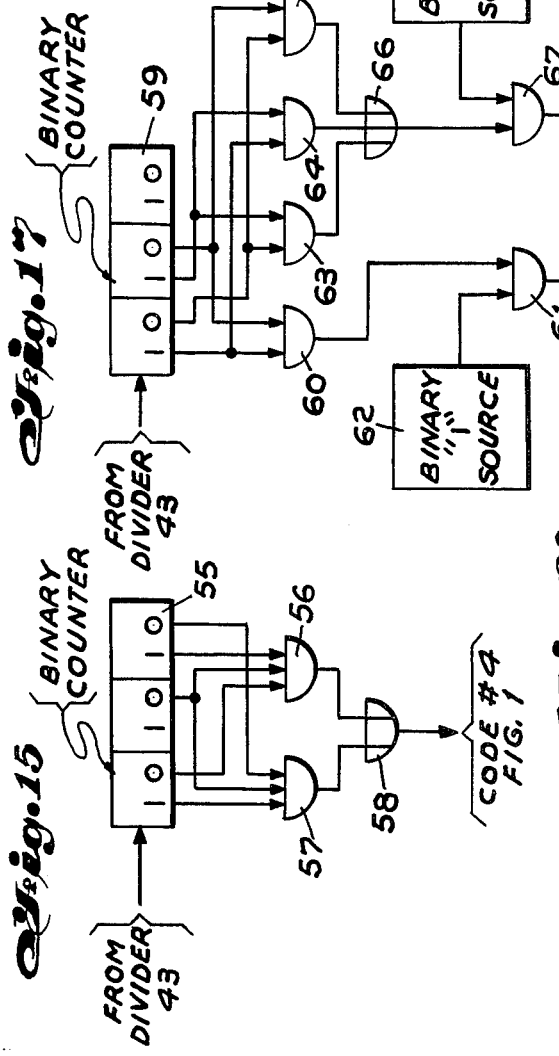
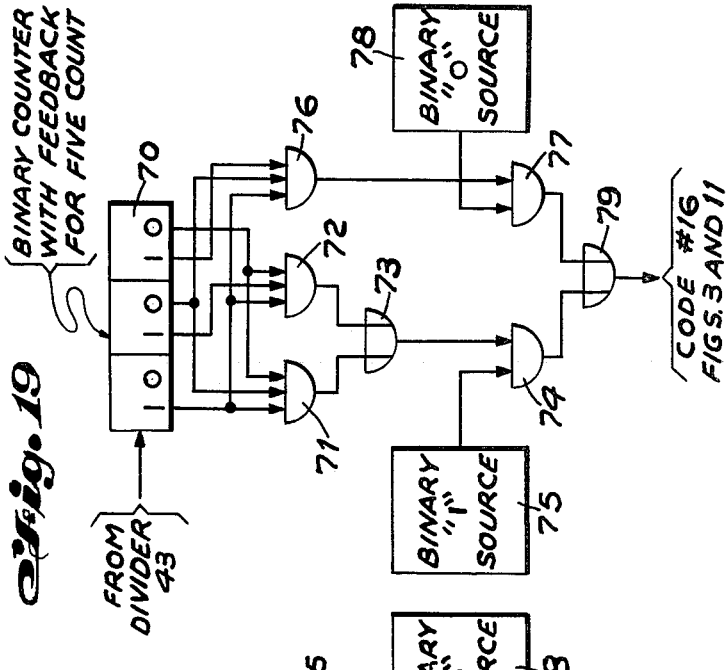
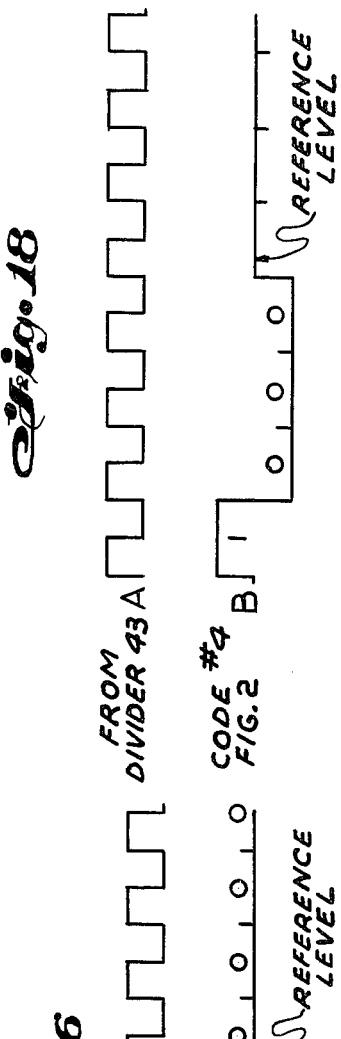
INVENTOR
FRANK S. GUTLEBER
BY Alfred C. Hill
AGENT

CODE GENERATOR TO PRODUCE PERMUTATIONS OF CODE MATES

BACKGROUND OF THE INVENTION

This invention relates to pulse signalling systems of the code type and more particularly to an improved autocorrelation technique for use in such pulse signalling systems.

Correlation techniques have been utilized in the past in signal processing systems employing signals in the form of a pulse or sequence of pulses. Such pulse signalling systems include, for example, radiant energy reflecting systems, such as radar, radio range finders, radio altimeters, and the like; pulse communication systems, such as over-the-horizon systems employing various types of scatter techniques, satellite communication systems and the like; and multiple access systems employing address codes to enable utilization of the multiple access system. Correlation techniques when employed in radiant energy reflection systems enhance the resolution of closely spaced reflecting surfaces and in addition, particularly when wide pulse widths are employed, increase the average power transmitted. Correlation techniques employed in pulse communication systems result in increased signal-to-noise ratios without increase of peak transmitter power and minimize multiple paths effects (fading). Correlation techniques when employed in a multiple access environment also result in increased signal-to-noise ratio without increase of transmitter power and if properly coded prevents or at least minimizes the interference or crosstalk between one or more address codes.

According to prior art correlation techniques the received signal is processed by obtaining the product of code elements of the received signal and code elements of a locally generated signal of the same waveform and period as the received signal and integrating the resultant product. The optimum output for such a correlation would be a single peak of high amplitude which has a width substantially narrower than the pulse width of the received signal. Most correlation systems in use today do not produce the desired optimum waveform, but rather provide an output whose waveform has spurious peaks in addition to the desired high amplitude peak. The presence of these spurious peaks is undesirable in that the resolving power of radiant energy reflecting systems is reduced, the signal-to-noise ratio of pulse communication systems and multiple access systems and the minimization of multiple path affects of pulse communication systems is reduced to a level below the optimum value.

Previously a number of improved correlation techniques have been proposed that will result in an impulse correlation function. The term "impulse correlation function", and more specifically "impulse autocorrelation function", as employed herein, refers to a waveform having a single high amplitude peak completely free from spurious peaks of lower amplitude elsewhere in the waveform.

One of these proposed improved autocorrelation techniques which is most closely related to the present invention is fully disclosed in the copending application of F. S. Gutleber, Ser. No. 645,697, filed June 13, 1967, now U.S. pat. No. 3,519,746. This copending application discloses a class of codes including two codes, termed code mates, where the code mates have cooperating autocorrelation functions so that when they are autocorrelation detected, and the resultant detected outputs are linearly added there is provided an impulse autocorrelation function having an impulse output at a given time and a zero output at all other times. The code mates generated are time or frequency multiplexed for transmission to the detector to provide long code sequence to increase the average transmitting power. The transmitted multiplexed code mates are separated consistent with the type of multiplexing being employed prior to autocorrelation detection and linear addition. The number of code mates can be increased in accordance with said copending application by interleaving each of the original code mates and the different time displaced versions thereof to provide a plurality of first codes and interleaving one code mate and the complemented version of the other code mate of each of the original code mates and the different time displaced versions thereof to provide a code mate for each of the first codes. This process of increasing the number of code mates can be continued repeatedly with the newly generated code mates to further increase the number of code mates.

The codes forming the code mates of said copending application require a complete code fill-in to work, that is, a code digit of either binary condition had to be present in each digit time slot of the repetition period of the code. Thus, the codes had to be repeated and the detection process required multiplying and integrating over N code digits for codes of length N.

SUMMARY OF THE INVENTION

An object of the present invention is to provide another class of pseudo-noise codes including code mates which do not require complete code fill-in to provide the desired impulse autocorrelation function.

Another object of this invention is to utilize multiplexing techniques for the code mates generated to reduce the complexity of code generation and yet maintain the advantage of having a long code sequence.

Still another object of this invention is to provide another class of code mates where the codes of the mates may have autocorrelation functions with high spurious peaks therein which are eliminated when the detected code outputs are linearly added together.

A further object of this invention is to provide another process operating on the original code mates and the resultant code mates to increase the number of code mates available.

Still a further object of this invention is to provide apparatus for operating on the original code mates and their resultant code mates to increase the number of code mates available and also to increase the length of the code mates.

A feature of this invention is a method of generating codes which upon detection will produce an impulse autocorrelation function comprising the steps of generating at least a first code having a first autocorrelation function and generating at least a second code having a second autocorrelation function predeterminedly related to the first autocorrelation function to produce upon detection of the first and second codes the desired impulse autocorrelation function, where each of the first and second codes include a plurality of digit time slots in a given repetitious period, at least one of the time slots of at least one of the first and second codes being blank.

Another feature of this invention is the provision of at least one of the first and second codes including the presence of a digit having either of two different conditions, such as binary "1" and "0" in at least the first and last of the digit time slots of the given code structure and said blank time slot disposed therebetween.

Still another feature of this invention is a system for generating codes which upon detection will produce an impulse autocorrelation function comprising first means to produce a first code and a second code each having a plurality of digit time slots and cooperating autocorrelation functions to produce upon detection of the first and second codes the impulse autocorrelation function, each of the digit time slots having a given period, first means to produce a control signal having a period equal to the given period, at least one third means coupled to the first and second means responsive to the control signal to produce a first output code including the digit time slots of one of the first and second codes interleaved with the digit time slots of the other of the first and second codes, and at least one fourth means coupled to the first and second means responsive to the control signal to produce a second output code including the digit time slots of one of the first code and the complement of the second code interleaved with the digit time slots of the other of the first code and the complement of the second code, the first and second output codes having cooperating autocorrelation functions to produce upon detection of the first and second output codes the impulse autocorrelation function.

BRIEF DESCRIPTION OF THE DRAWING

The above mentioned and other features and objects of this invention will become more apparent by reference to the following description taken in conjunction with the accompanying drawings, in which:

FIG. 1 is an illustration of the required code format for code mates in accordance with said copending application;

FIG. 2 is an illustration of a code format in accordance with the principles of the present invention;

FIG. 3 is an illustration of still another format for the code mates in accordance with the principles of this invention;

FIG. 4 is a tabulation of codes and their autocorrelation functions to demonstrate in accordance with the principles of this invention the presence of code mates;

FIG. 5 is a tabulation of equations utilized to increase the number of code mates in accordance with the principles of this invention;

FIGS. 6 and 7 are tabulations of how the code mates of FIG. 4 are expanded in accordance with the equations of FIG. 5;

FIG. 8 is an illustration of other code mates and their autocorrelation functions meeting the requirements of the present invention;

FIGS. 9 and 10 are tabulations of unique code mates produced from the code mates of FIG. 8 in accordance with the equations of FIG. 5;

FIG. 11 is a tabulation of the format and autocorrelation functions of still other code mates meeting the requirements of the present invention;

FIG. 12 is a block diagram of a communication system in which the code mates of the present invention may be employed to produce the desired impulse autocorrelation function;

FIG. 13 is a block diagram of a system for carrying out the operation set forth by the equations of FIG. 5 repeatedly;

FIG. 14 is a timing diagram illustrating the operation of FIG. 13;

FIG. 15 is a block diagram illustrating one form of code generator that may be employed in FIG. 13;

FIG. 16 is a timing diagram illustrating the operation of FIG. 15;

FIG. 17 is still another block diagram which may be employed as the code generators of FIG. 13;

FIG. 18 is a timing diagram illustrating the operation of FIG. 17;

FIG. 19 is a block diagram of still another arrangement that may be employed for the code generators of FIG. 13; and FIG. 20 is a timing diagram illustrating the operation of FIG. 19.

DESCRIPTION OF THE pREFERRED EMBODIMENTS

Referring to FIG. 1, the format of two codes forming code mates in accordance with said copending application illustrates the requirement that there must be a digit of either binary condition in all the digit time slots of the sampling information period T.

Referring to FIG. 2, there is illustrated therein the format of codes No. 4 and No. 5 of FIG. 4 illustrating one form of code mates that do not require complete code fill-in to work. The blank digit time slots equal four in the illustration but may be of any number of digit time slots consistent with the application in which the code mates are employed. FIG. 3 illustrates still another form of code mates which may be referred to as gapped codes in which it is required that the first and last digit time slot include a digit of either of two conditions, such as binary 1 and 0 with blank time slots being disposed between the first and last digit time slots of the code length T.

As is apparent from FIGS. 2 and 3 complete code fill-in within the repetition period T is not required. In addition the codes do not have to repeat and the detection process does not have to multiply and integrate over the complete repetition period. The advantage of not requiring a continuous code structure is that more code mates having autocorrelation functions that cooperate to produce one impulse output at a given time and on zero outputs at other times are available and their utilization covers a much broader field.

Since the codes forming the code mates are not continuous, translated codes are still unique. This allows $2^N - 2$ possible codes for a binary code sequence containing a code length of N bits. The quantity 2 is subtracted since a code with all ones or all zeros are excluded from being possible candidates for forming code mates. If in addition, negative codes are excluded, the quantity of unique codes q is reduced by a factor of 2 resulting in the following formula:

$$q = 2^N - 2/2 = 2^{N-1} - 1.$$

Considering a code having a code length of four digits and utilizing the above equation it is determined that seven unique codes are available which are illustrated in FIG. 4 along with their autocorrelation function $\emptyset$ $aa(t)$ times the number of code digits N. Inspection of the autocorrelation functions of FIGS. 4 reveal that two code mates exist, namely, codes No. 4 and No. 5 form first code mates and codes No. 6 and 7 form second code mates.

Each of these code mates may be generated into longer codes of length $4 \times 2^N$. This is accomplished by interleaving the codes of code mates to form one of the new codes. The mate for this new code is then obtained by interleaving the original code with the negative or complement of its mate. These new codes then form code mates of twice the lenth of the original code mates. The repeated application of this process then results in codes whose length is some power of 2. A general proof verifying that the new codes do form code mates is contained in said copending application in conjunction with equation (10) to (18). Since it doesn't matter which code forming the code mates starts the interleaving process and, in addition, since a code having a given sequence of code digits and a code having an inverted sequence of code digits have the same autocorrelation function then eight new code mates may be generated from each existing code mates. The equations representing this process of increasing the number of code mates are illustrated in FIG. 5. In general, if a code is represented by a and its mate is represented by b and when they are interleaved, this process being indicated in FIG. 5 by I, the first code digit of the interleaving process is the first code digit of the first code in the equation. For instance, equation No. 1 for the code reads $aIb$. If code $a = a_1 a_2 a_3$ and $b = b_1 b_2 b_3$ then the interleaving process would result in a code $A = a_1 b_1 a_2 b_2 a_3 b_3$. On the other hand, if equation No. 2 is employed, which reads $bIa$, then the interleaving process would result in a code $A = b_1 a_1 b_2 a_2 b_3 a_3$. This designation of which codes start the interleaving process hold forth for the other equations shown in FIG. 5 for both the code and its mate. In addition, the negative or complement of a code $x$ will be indicated by $\bar{x}$ while an inverted sequence of code $x$ is represented as $\utilde{x}$. The negative or complement of a binary code is achieved by changing each code digit to its opposite binary value, that is, 1 becomes 0 and 0 becomes 1. An inverted code is obtained by reading the code from the back to the front, that is, $a_1 a_2 a_3$ becomes $a_3 a_2 a_1$.

It will now be demonstrated how the code mates formed by code No. 4 and No. 5, FIG. 4 can be expanded in accordance with the equations of FIG. 5. Let Code No. 4 = a = 1000
Code No. 5 = b = 0100
$\bar{b}$ = 1011
$\utilde{b}$ = 0010
$\utilde{\bar{b}}$ = 1101
$\utilde{a}$ = 0001

The above values are utilized in conjunction with equations of FIG. 5 to generate the new code mates as illustrated in FIG. 6.

To demonstrate the code mate expansion process with respect to codes No. 6 and No. 7, FIG. 4, let Code No. 6 = a = 0010
Code No. 7 = b = 0001
$\bar{b}$ = 1110
$\utilde{b}$ = 1000
$\utilde{\bar{b}}$ = 0111
$\utilde{a}$ = 0100

Figures 7, 8, 9, 10:
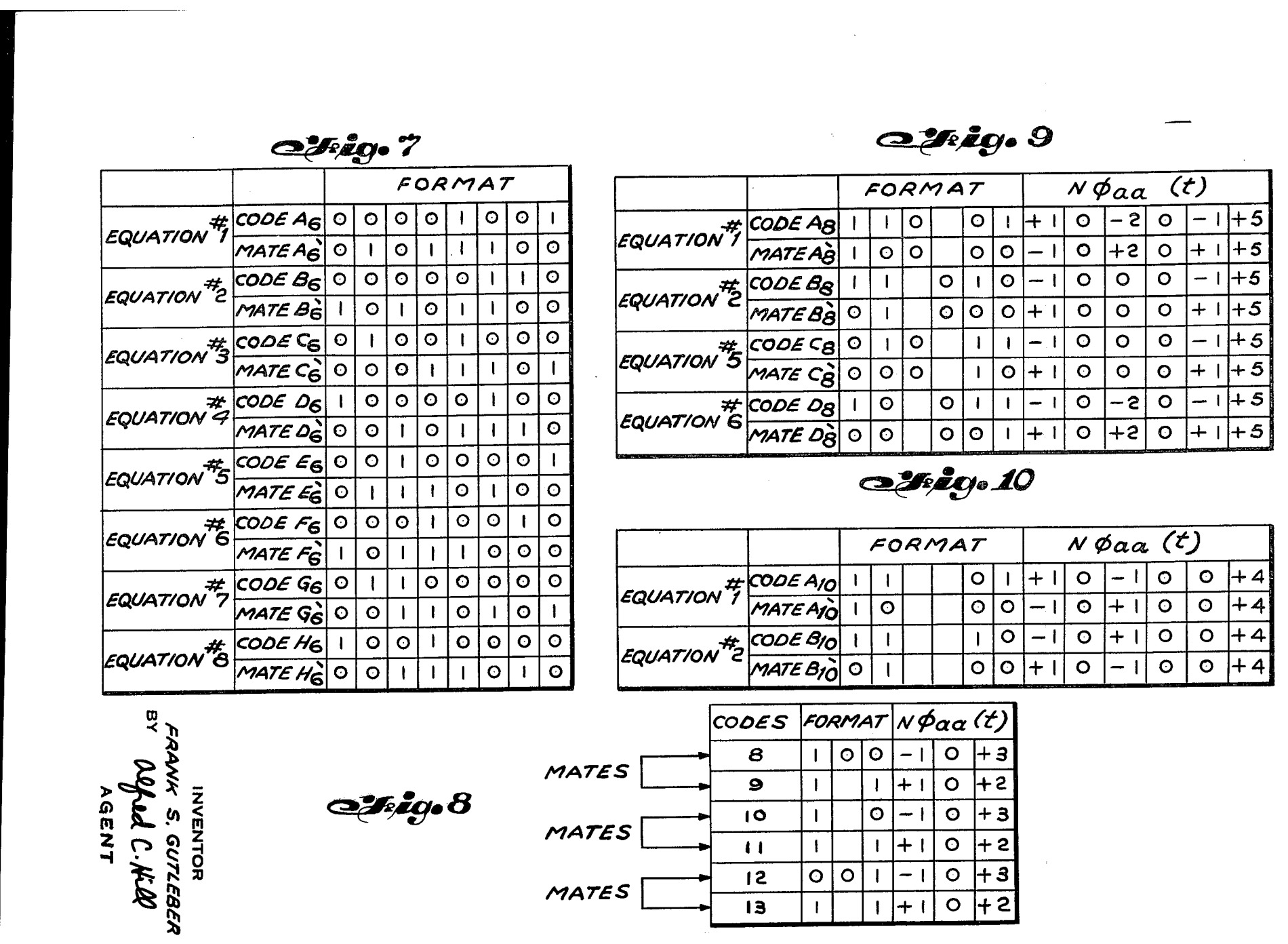

Using these values in the equations of FIG. 5 results in the new code mates illustrated in FIG. 7.

Referring to FIG. 8, there is illustrated therein three code mates of the gapped code type along with their autocorrelation function $\emptyset aa(t)$ times N. It was illustrated in connection with FIGS. 6 and 7 that by employing the equations of FIG. 5 each of the original code mates of FIG. 4 generated eight unique code mates. There are instances where while eight code mates can be generated for each original code mates the resultant code mates are not always unique. This would occur when an inverted code sequence is the same as the original code sequence, or when an inverted code sequence is the same as the negative or complement of the original code. These conditions will become more clear by expanding the three code mates of FIGS. 8. First consider the code mates formed by codes No. 8 and No. 9. Let Code No. 8 = a = 100
Code No. 9 = b = 1—1
$\bar{b}$ = 0—0
$\utilde{a}$ = 001
$\utilde{b}$ = 1—1
$\utilde{\bar{b}}$ = 0—0

It will be observed from the above tabulated variables to be operated upon in accordance with the equations of FIG. 5 that $\utilde{b} = b$ and $\utilde{\bar{b}} = \bar{b}$. Due to this situation equation No. 1 = equation No. 3, equation No. 2 = equation No. 4, equation No. 5 = equation No. 7 and equation No. 6 = equation No. 8. Thus, only four unique codes can be generated by employing equations No. 1, No. 2, No. 5 and No. 6 resulting in four code mates as illustrated in FIG. 9 along with their autocorrelation function $\emptyset aa(t)$ times N.

Expanding the code mates formed from codes No. 10 and No. 11 we have the following relations.

Code No. 10 = a = 1-0
Code No. 11 = b = 1—1
b = 0—0
a = 0-1
$\utilde{b}$ = 1—1
$\utilde{\bar{b}}$ = 0—0

Here again the condition of $\utilde{b} = b$ and $\utilde{\bar{b}} = \bar{b}$ is present. Thus, only four unique code mates can be produced in accordance with equations No. 1, No. 2, No. 5 and No. 6. However, there is also present the condition that $\utilde{a} = \bar{a}$. In other words, the inverted code sequence is the same as the negative or complement of the original code. Under these circumstances, equations No. 5 and No. 6 will not produce unique codes, therefore, only two unique code mates are capable of being produced from the code mates formed by codes No. 10 and No. 11. These new code mates are illustrated in FIG. 10 along with their autocorrelation function $\emptyset aa(t)$ times N.

The code mates formed by codes No. 12 and No. 13 will not produce any unique codes since the codes of the third code mates are the inverted code sequence of the code formed by codes No. 8 and No. 9. Thus, the six new code mates illustrated in FIGS. 9 and 10 are the only unique code mates that can be obtained from the code mates of FIG. 8 utilizing the equations of FIG. 5.

Referring to FIG. 11, there is tabulated therein seven additional code mates that meet all the requirements of the present invention together with their autocorrelation function $\emptyset aa(t)$ times N. The code expansion process, as dictated by the equations of FIG. 5, can be utilized for each of the code mates illustrated to generate new code mates. Utilizing the techniques set forth hereinabove of identifying the variables that are present in the equations of FIG. 5 and examining the resultant code sequences, it is possible to determine how many unique code mates will be produced by each of the original code mates.

Codes No. 14 and No. 15 can only produce two new unique code mates as identified by equations No. 1 and No. 2 since $b = \underset{\sim}{b}$, $\overline{b} = \underset{\sim}{\overline{b}}$ and $a = \overline{a}$.

Codes No. 16 and No. 17 can only produce four unique new code mates in accordance with equations No. 1, No. 2, No. 5, and No. 6, since $b = \underset{\sim}{b}$ and $\overline{b} = \overline{\underset{\sim}{b}}$.

Codes No. 18 and No. 19 like codes No. 16 and No. 17 can only produce four unique new code mates as determined by equations No. 1, No. 2, No. 5, and No. 6 for the same reasons set forth hereinabove with respect to codes No. 16 and No. 17.

The code mates formed by codes No. 20 and No. 21, the code mates formed by codes No. 22 and No. 23, the mates formed by codes No. 24 and No. 25 and the code mates formed by codes No. 26 and No. 27 all have the characteristic of producing for each original code mate eight new code mates since the code sequences representing the variables of the equations of FIG. 5 are in themselves all unique.

For each of the new code mates produced from the original code mates the expansion process defined by the equations of FIG. 5 can be employed for each of the code mates to generate still other new code mates having twice the length of the code mates from which they are generated. This process can be repeatedly continued for all new code mates generated. For instance, the new code identified as A and its mate identified as B can be substituted in the equations of FIG. 5 by letting A equal $a$ and B equal $b$.

Referring to FIG. 12, there is illustrated therein the basic communication system that can be employed with the code mates of this invention. The system of FIG. 12 is identical to the system disclosed in said copending application with the specific details thereof being substantially identical to the details disclosed in said copending application with only the necessary modifications to provide the gaps and incomplete fillin in the codes forming the code mates of the present invention. These gaps and lack of fill-in in the codes of the present invention can be obtained from the basic code generator of said copending application illustrated in FIG. 19 by providing no connection between delay line taps and the 1 and 0 gates at the appropriate time position. Generator 30 generates the code mates, either the original code mates or expanded code mates with the code being identified as $S_1$ and its mate as $S_2$. The output of generator 30 is coupled to a multiplexer 31 which may be a time or a frequency multiplexer to appropriately multiplex the code $S_1$ and its mate $S_2$ prior to application to a power amplifier 32 and an antenna 33 for transmission to a receiving antenna 34 which is coupled to a receiver 35. The resultant multiplexed code signals $S_1$ and $S_2$ are coupled to a demultiplexer 36 which is consistent with the type of multiplexing being employed. In other words, if time multiplexing is employed the demultiplexer must work on a time basis while if frequency multiplexing is employed the demultiplexer 36 must operate on a frequency basis. The code $S_1$ and its mate $S_2$ are coupled to detectors for the code mates 37 which may be of the autocorrelation or matched filter type. The resultant output of detectors 37 are then coupled to a linear adder 38 producing an output to low pass filter 39 which is the desired impulse autocorrelation function having an impulse output at a given time and a zero output at all other times.

Referring to FIG. 13, there is illustrated therein an arrangement for performing the operations defined by the equations of FIG. 5 and to repeatedly carry on this operation to increase the length of code mates and the number of code mates to any desired length or number. Base code generator 40 is controlled by clock pulses generated by clock source 41 and a frequency dividing chain including binary dividers 42 and 43. The frequency of the clock pulses applied to generator 40 is equal to the bit rate of the codes generated in generator 40 and thus has a period equal to the period of a digit time slot. The codes $a$ and $b$ are produced by generator 40 and applied through switches 44 and 45 to interleaving generator 46. The resultant output code mates may then be applied in sequence to other interleaving generators identical in structure to generator 46, as illustrated by generator 46c and 46n. The only difference between the interleaving generators is the frequency or period of the control signal provided from the dividers 42 and 43 forming a part of the frequency dividing chain. The control signal for each interleaving generator input has a frequency equal to the bit rate of that particular generator, or in other words have a repetitious period equal to the period of a digit time slot of the input code to that particular interleaving generator.

Each of the interleaving generators 46 include an AND gate 47 coupled to the code produced by the preceding circuit or the code a output of code generator 40 as illustrated in the case of generator 46. The mate code from the preceding generator 46 or code b from code generator 40 is coupled directly to INHIBIT gate 48 and through phase inverter 49 to INHIBIT gate 50. The AND gate 47 and the INHIBIT gates 48 and 50 are controlled by a control signal from the frequency divider chain which in the case of generator 46 is the output of divider 43. Under control of this control signal, linear adder 51 interleaves the digit time slots of code $a$ at the output of AND gate 47 and of code $b$ at the output of INHIBIT gate 48 to produce a new code A of twice the length of the original code. The mate code A' having twice the length as the original codes is produced by linear adder 52 which interleaves the digit time slots of code a at the output of AND gate 47 and the complemented code $b$ at the output of INHIBIT gate 50. Succeeding interleaving generators produce output code mates equal to twice the length of the input code mates.

Referring to FIG. 14, the operation of generator 46 and 46c is illustrated where curve A represents the digit time slots of code $a$, curve B represents the digit time slots of code $b$ and curve c represents the complement of code $b$ at the output of inverter 49. The control signal from divider 43 coupled to generator 46 is illustrated in curve D. The interleaved digit time slots of codes $a$ and $b$ are illustrated in curve E and is the output of adder 51. The output of adder 52, the interleaved digit time slots of code $a$ and the complement of code $b$, is illustrated in curve F. The code sequence in curves E and F represents, respectively, the code A and its mate A' which are coupled to interleaving generator 46c. The output of phase inverter 49c is illustrated in curve G which is the complement of the code sequence in curve F. The control signal for generator 46c from divider 42 is illustrated in curve H. The new code produced by linear adder 51c is illustrated in curve I and the mate thereof at the output of adder 52c is illustrated in curve J and are, respectively, the new code $A_c$ and its mate $A_c'$. This interleaving process by utilizing additional interleaving generators 46 will continue until the desired code $A_n$ and its mate $A_n'$ is produced at the output of at the last interleaving generator, such as generator $46_n$. The bit rate of the codes produced by generator $46_n$ will be at the same frequency as the clock pulses from source 41.

With switches 44 and 45 in the position illustrated process defined by equation No. 1 is achieved. By positioning switch 44 in its other position, the code $\underline{b}$ output of inverted digit sequence code generator 53 will be coupled to generator 46 and generator 46 will perform the operation dictated by equation No. 3. By positioning switch 44 as illustrated and moving switch 45 to its other position interleaving generator 46 will perform the operation dictated by equation No. 5. By moving both switches 44 and 45 to their other position generator 46 will perform the operation dictated by equation No. 7.

It will be observed that due to the timing of the control signals coupled to generators 46 the first digit of code a or code $\underline{a}$ is always the first digit of the resultant interleaved codes. Thus, to enable the operation as dictated by equations No. 2, No. 4, No. 6 and No. 8 of FIG. 5 there is inserted in the frequency divider chain delay 54 equal to $t/2$, where $t$ equals the time period of a digit time slot. The resultant control signal from divider 43 is illustrated in curve K, FIG. 14. To ensure that the codes produced by generators 40 and 53 are not shifted in time due to the shift of the control signal, a suitable delay must be contained in the clock input lead to both generators 40 and 53 so that the codes produced will have the timing illustrated in curves A and B, FIG. 14. Under the condition of the control signal illustrated in curve K, FIG. 14 there will be produced at the output of adder 51 and 52 the code sequences illustrated in curves L and M FIG. 14, respectively. The complement of the code sequence of curve M, FIG. 14 at the output of inverter 49c is illustrated in curve N, FIG. 14. The output of divider 42 with delay 54 in the circuit is illustrated by curve 0, FIG. 14 with the resultant code sequences at the output of adders 51c and 52c being illustrated in curves F and Q, FIG. 14, respectively.

Referring to FIG. 15, there is illustrated therein one form of code generator that can be employed in generator 40 including binary counter 55, AND gates 56 and 57, and OR gate 58 which operates in a well known manner on clock pulses, such as from divider 43, illustrated in curve A, FIG. 16. AND gates 56 and 57 are coupled to the appropriate outputs of the bistable devices forming counter 55 to produce code No. 4, FIG. 1 as illustrated in curve B, FIG. 16.

To produce a code signal, such as code No. 4, FIG. 2, which in affect is a three level or condition code, the arrangement of FIG. 17 may be employed. FIG. 17 includes binary counter 59. AND gate 60 is connected to the appropriate outputs of the first two stages of counter 59 to produce a pulse output for the first clock pulse of curve A, FIG. 18. The output from AND gate 60 is then coupled to AND gate 61 which in turn is coupled to source 62 to provide an indication of a first condition or binary 1 which in the illustration of FIG. 18 may be represented by a positive voltage. AND gates 63, 64 and 65 are connected to the appropriate outputs of the first two stages of counter 59 to generate pulse outputs for the second, third and fourth clock pulses. The resultant outputs from AND gates 63, 64 and 65 are coupled to OR gate 66 and, hence, to AND gate 67 which has coupled thereto source 68 which provides an indication of a second condition or binary 0. As illustrated in FIG. 18, binary 0 may be represented by a negative voltage. The last stage of counter 59 just counts and produces no useful output and thus OR gate 69 will produce no output during the time of the fifth, sixth, seventh, and eighth clock pulses but will provide an output during the first four clock pulses due to the operation of AND gates 61 and 67 as illustrated in curve B, FIG. 18. The lack of output, the third condition, during the last four clock pulses represents the blanks at the reference level illustrated in the last four digit time slots of curve B, FIG. 18. As mentioned in connection with FIG. 2, the number of blank digit time slots can be increased or decreased from that shown. An increase in the blank time slots can be obtained by adding other counter stages to counter 59 and less blank digit time slots can be obtained by utilizing appropriate feedback to reduce the count of counter 59.

FIG. 19 illustrates an arrangement for generating code No. 16 of FIGS. 3 and 11 as illustrated in curve B, FIG. 20. Here again the first condition or binary 1 may be represented by a positive value and the second condition or binary 0 may be represented by a negative voltage value while the third condition, a blank digit time slot, is represented by the reference level, such as no output. The code generator of FIG. 19 includes binary counter 70 having appropriate feedback to count to five rather than to its normal eight. AND gates 71 and 72 are connected to appropriate stages and appropriate outputs of these stages to produce a pulse output in the first and third digit time slots. The output from AND gates 71 and 72 is coupled to OR gate 73 and, hence, to AND gate 74 which has coupled thereto source 75 to provide the binary 1 indication. AND gate 76 is coupled to appropriate ones of the stages and appropriate outputs of these stages to produce a pulse output during the fifth time slot in response to the fifth clock pulse of curve A, FIG. 20. This output from AND gate 76 is coupled to AND gate 77 which has coupled thereto source 78 to provide the binary 0 indication. The outputs from AND gates 74 and 77 are coupled to OR gate 78 to provide code No. 16 as illustrated in curve B, FIG. 20. There will be no output during digit time slots and four thereby producing the required blank digit time slots of code No. 16.

It will be appreciated that there is illustrated FIGS. 15, 17 and 19 arrangements to produce only the codes, such as code $a$ of generator 40, FIG. 13. A similar arrangement would be employed with appropriate connection of AND gates to the counter stages to produce the mate for the codes illustrated in FIG. 16, 18 and 20.

Code generator 53 can have a configuration similar to that illustrated in FIGS. 15, 17 and 19 but having the AND gates arranged to invert the digit sequence of the code or its mate.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for generating codes which upon detection will produce an impulse autocorrelation function comprising:
first means to produce a first code and a second code each having a plurality of digit time slots and cooperating autocorrelation functions to produce upon detection of said first and second codes said impulse autocorrelation function including an impulse output at a given time and a zero output at all oother times, each of said digit time slots having a given period;
second means to produce a control signal having a period equal to said given period;
at least one third means coupled to said first and second means responsive to said control signal to produce a first output code including the digit time slots of one of said first and second codes interleaved with the digit time slots of the other of said first and second codes; and
at least one fourth means coupled to said first and second means responsive to said control signal to produce a second output code including the digit time slots of one of said first code and the complement of said second code interleaved with the digit time slots of the other of said first code and the complement of said second code;
said first and second output codes having cooperating autocorrelation functions to produce upon detection of said first and second output codes said impulse autocorrelation function.

2. A system according to claim 1, wherein said third means includes:
an AND gate coupled to said first means and said second means responsive to said first code and said control signal,
a first INHIBIT gate having an inhibit terminal and an input terminal, said inhibit terminal being coupled to said second means responsive to said control signal and said input terminal being coupled to said first means responsive to said second code, and
a first linear adder coupled to said AND gate and said first INHIBIT gate to produce said first output code; and said fourth means includes:
a phase inverter coupled to said first means responsive to said second code,
a second INHIBIT gate having an inhibit terminal and an input terminal, said inhibit terminal being coupled to said second means responsive to said control signal and said input terminal being coupled to said phase inverter, and
a second linear adder coupled to said AND gate and said second INHIBIT gate to produce said second output code.

3. A system according to claim 1, including
a plurality of third means coupled in tandem to said first means and each other;
a plurality of fourth means coupled in tandem to said first means and each other;
said second means producing a different control signal for each of said third and fourth means, said control signal coupled to an associated one of said third and fourth means having a period equal to the period of the digit time slot of said first and second output codes of the preceding one of said third and fourth means;
each of said third means except the first of said third means producing said first output signal including the digit time slots of one of said first and second output codes of the preceding one of said third and fourth means interleaved with the digit time slots of the other of said first and second output codes of said preceding one of said third and fourth means; and
each of said fourth means except the first of said fourth means producing said second output signal including the digit time slots of one of said first output code and the complement of said second output code of the preceding one of said third and fourth means interleaved with the digit time slots of the other of said first output code and the complement of said second output code of the preceding one of said third and fourth means.

4. A system according to claim 3 wherein
each of said third means includes
an AND gate coupled to said first means and said second means responsive to said first code and said control signal,
a first INHIBIT gate having an inhibit terminal and an input terminal, said inhibit terminal being coupled to said second means responsive to said control signal and said input terminal being coupled to said first means responsive to said second code, and
a first linear adder coupled to said AND gate and said first INHIBIT gate to produce said first output code; and
each of said fourth means includes
a phase inverter coupled to said first means responsive to said second code,
a second INHIBIT gate having an inhibit terminal and an input terminal, said inhibit terminal being coupled to said second means responsive to said control signal and said input terminal being coupled to said phase inverter, and
a second linear adder coupled to said AND gate and said second INHIBIT gate to produce said second output code.

5. A system according to claim 1, further including
fifth means to produce at least a third code having an autocorrelation function identical with the autocorrelation function of said first code and a sequence of code digits inverted with respect to the code digits of said first code; and
sixth means coupled to said first, third, fourth and fifth means to disconnect said first code from the input of said third and fourth means and to connect said third code to the input of said third and fourth means to cause said third means to produce said first output code including the digit time slots of one of said second and third codes interleaved with the digit time slots of the other of said second and third codes and to cause said fourth means to produce said second output code including the digit time slots of one of said complemented second code and said third code interleaved with the digit time slots of the other of said complemented second code and said third code.

6. A system according to claim 5, including
a plurality of third means coupled in tandem to said first and sixth means and each other;
a plurality of fourth means coupled in tandem to said first and sixth means and each other;
said second means producing a different control signal for each of said third and fourth means, said control signal coupled to an associated one of said third and fourth means having a period equal to the period of the digit time slot of said first and second output codes of the preceding one of said third and fourth means;

each of said third means except the first of said third means producing said first output signal including the digit time slots of one of said first and second output codes of the preceding one of said third and fourth means interleaved with the digit time slots of the other of said first and second output codes of said preceding one of said third and fourth means; and each of said fourth means except the first of said fourth means producing said second output signal including the digit time slots of one of said first output code and the complement of said second output code of the preceding one of said third and fourth means interleaved with the digit time slots of the other of said first output code and the complement of the second output code of the preceding one of said third and fourth means.

7. A system according to claim 1, further including fifth means to produce at least a third code having an autocorrelation function identical with the autocorrelation function of said second code and a sequence of code digits inverted with respect to the code digits of said second code; and sixth means coupled to said first, third, fourth and fifth means to disconnect said second code from the input of said third and fourth means and to connect said third code to the input of said third and fourth means to cause said third means to produce said first output code including the digit time slots of one of said first and third codes interleaved with the digit time slots of the other of said first and third codes and to cause said fourth means to produce said second output code including the digit time slots of one of said first code and the complement of said third code interleaved with the digit time slots of the other of said first code and the complement of said third code.

8. A system according to claim 7, including
a plurality of third means coupled in tandem to said first and sixth means and each other;
a plurality of fourth means coupled in tandem to said first and sixth means and each other;
said second means producing a different control signal for each of said third and fourth means, said control signal coupled to an associated one of said third and fourth means having a period equal to the period of the digit time slot of said first and second output codes of the preceding one of said third and fourth means;

each of said third means except the first of said third means producing said first output signal including the digit time slots of one of said first and second output codes of the preceding one of said third and fourth means interleaved with the digit time slots of the other of said first and second output codes of said preceding one of said third and fourth means; and each of said fourth means except the first of said fourth means producing said second output signal including the digit time slots of one of said first output code and the complement of said second output code of the preceding one of said third and fourth means interleaved with the digit time slots of the other of said first output code and the complement of said second output code of the preceding one of said third and fourth means.

9. A system according to claim 1, further including
fifth means to produce at least a third code and fourth code, said third code having an autocorrelation function identical with the autocorrelation function of said first code and a sequence of code digits inverted with respect to the code digits of said first code and said fourth code having an autocorrelation function identical with the autocorrelation function of said second code and a sequence of code digits inverted with respect to the coded digits of said second code; and sixth means coupled to said first, third, fourth and fifth means to disconnect said first and second codes from the input of said third and fourth means and to connect said third and fourth codes to the input of said third and fourth means to cause said third means to produce said first output code including the digit time slots of one of said third and fourth codes interleaved with the digit time slots of the other of said third and fourth codes and to cause said fourth means to produce said second output code including the digit time slots of one of said third code and the complement of said fourth code interleaved with the digit time slots of the other of said third code and the complement of said fourth code.

10. A system according to claim 9, including
a plurality of third means coupled in tandem to said sixth means and each other;
a plurality of fourth means coupled in tandem to said sixth means and each other;
said second means producing a different control signal for each of said third and fourth means, said control signal coupled to an associated one of said third and fourth means having a period equal to the period of the digit time slot of said first and second output codes of the preceding one of said third and fourth means;

each of said third means except the first of said third means producing said first output signal including the digit time slots of one of said first and second output codes of the preceding one of said third and fourth means interleaved with the digit time slots of the other of said first and second output codes of said preceding one of said third and fourth means; and each of said fourth means except the first of said fourth means producing said second output signal including the digit time slots of one of said first output code and the complement of said second output code of the preceding one of said third and fourth means interleaved with the digit time slots of the other of said first output code and the complement of said second output code of the preceding one of said third and fourth means.

* * * * *